United States Patent

[11] 3,613,726

[72] Inventor Jorge Torres
 Newbury Park, Calif.
[21] Appl. No. 517,208
[22] Filed Dec. 2, 1965
[45] Patented Oct. 19, 1971
[73] Assignee Purolator Products, Inc.
 Rahway, N.J.
 Continuation-in-part of application Ser. No. 38,634, June 24, 1960, now abandoned.

[54] BALANCED PRESSURE COUPLING
 19 Claims, 10 Drawing Figs.
[52] U.S. Cl. ..................................... 137/614.03,
 285/86, 285/316
[51] Int. Cl. ..................................... F16l 37/22
[50] Field of Search ............................ 137/613,
 614, 614.01, 614.02, 614.03, 614.04, 614.05,
 614.06, 614.11, 614.13, 614.19; 251/89, 89.5,
 149.9; 277/180; 285/86, 277, 315, 316

[56] References Cited
 UNITED STATES PATENTS
2,553,680  5/1951  Scheiwer ..................... 137/596
2,837,352  6/1958  Wurzburger ................ 137/614.03 X
2,854,259  9/1958  Clark .......................... 137/614.03
2,958,544  11/1960 Wurzburger ............... 137/614.03
3,123,099  3/1964  Breuning et al ............ 137/614.06

Primary Examiner—M. Cary Nelson
Assistant Examiner—David R. Matthews
Attorney—Smyth, Roston & Pavitt CLAIM: 1. A coupling assembly for releasably interconnecting a first passage means and a second passage means for flow of pressurized fluid between the two passage means, comprising:
 a first coupling means and a second coupling means for mounting on the ends of said first and second passage means respectively, said two coupling means being adapted to mate to place the two passage means in fluid communication with each other,
 said two coupling means when mated having opposed surfaces of equal area exposed to the pressure of the confined fluid with equal central portions of said opposed surfaces on the two coupling means respectively with said central portions vented to the atmosphere to keep the pressurized fluid from creating separation pressure between said equal central portions of the opposed surfaces,
 the remaining portions of said opposed surfaces being of equal area and being connected to only one of said coupling means when the two coupling means are mated to transmit the opposite fluid pressures to the same coupling means to keep the opposite fluid pressures from exerting separation pressure between the two coupling means over the area of said remaining portions of the opposed surfaces,
 said two coupling means when mated forming a continuous fluid passage in which the direction of flow at the juncture of the two coupling means is perpendicular to the common axis of the two coupling means.

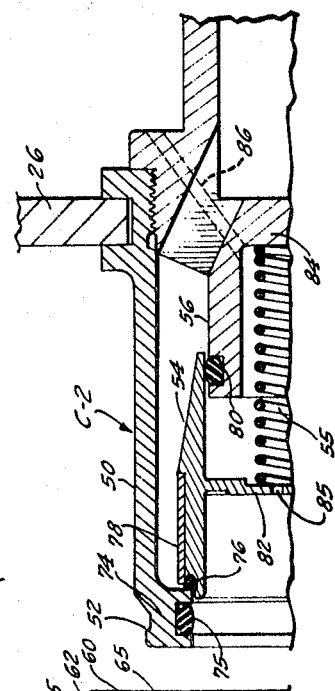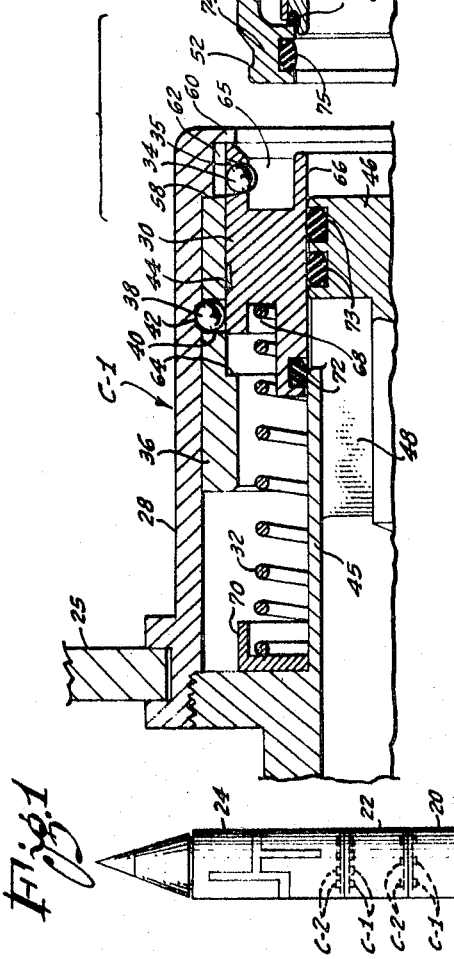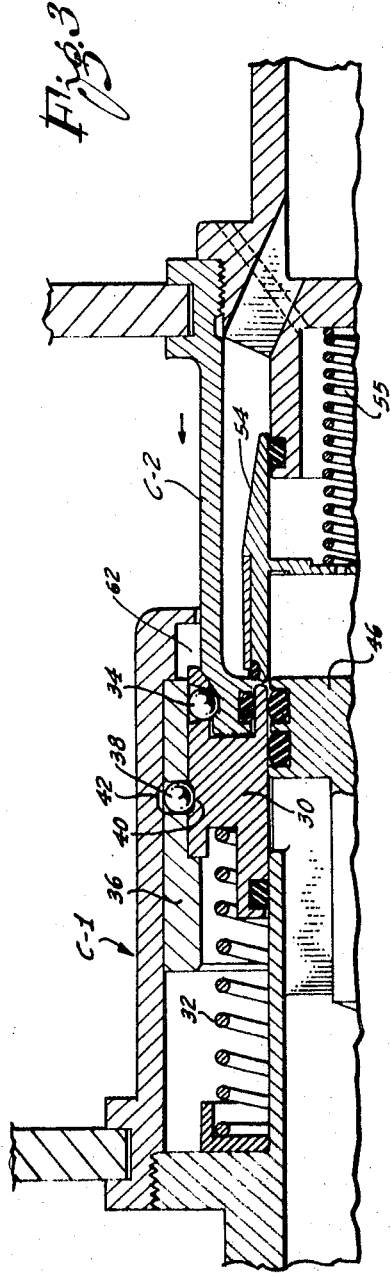

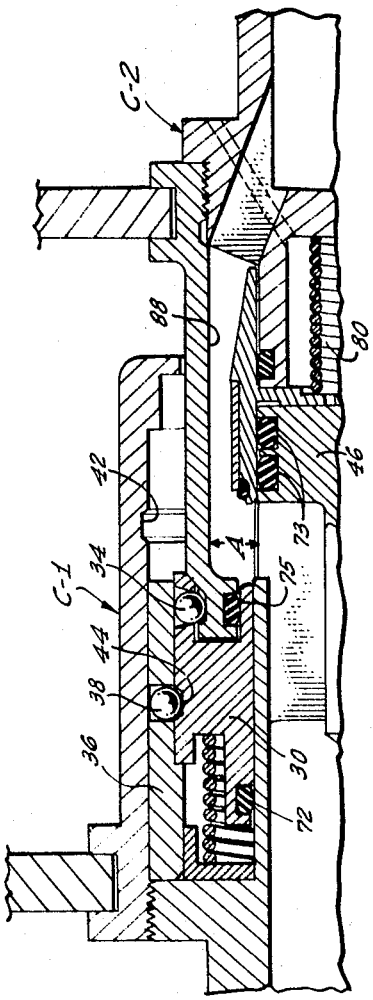

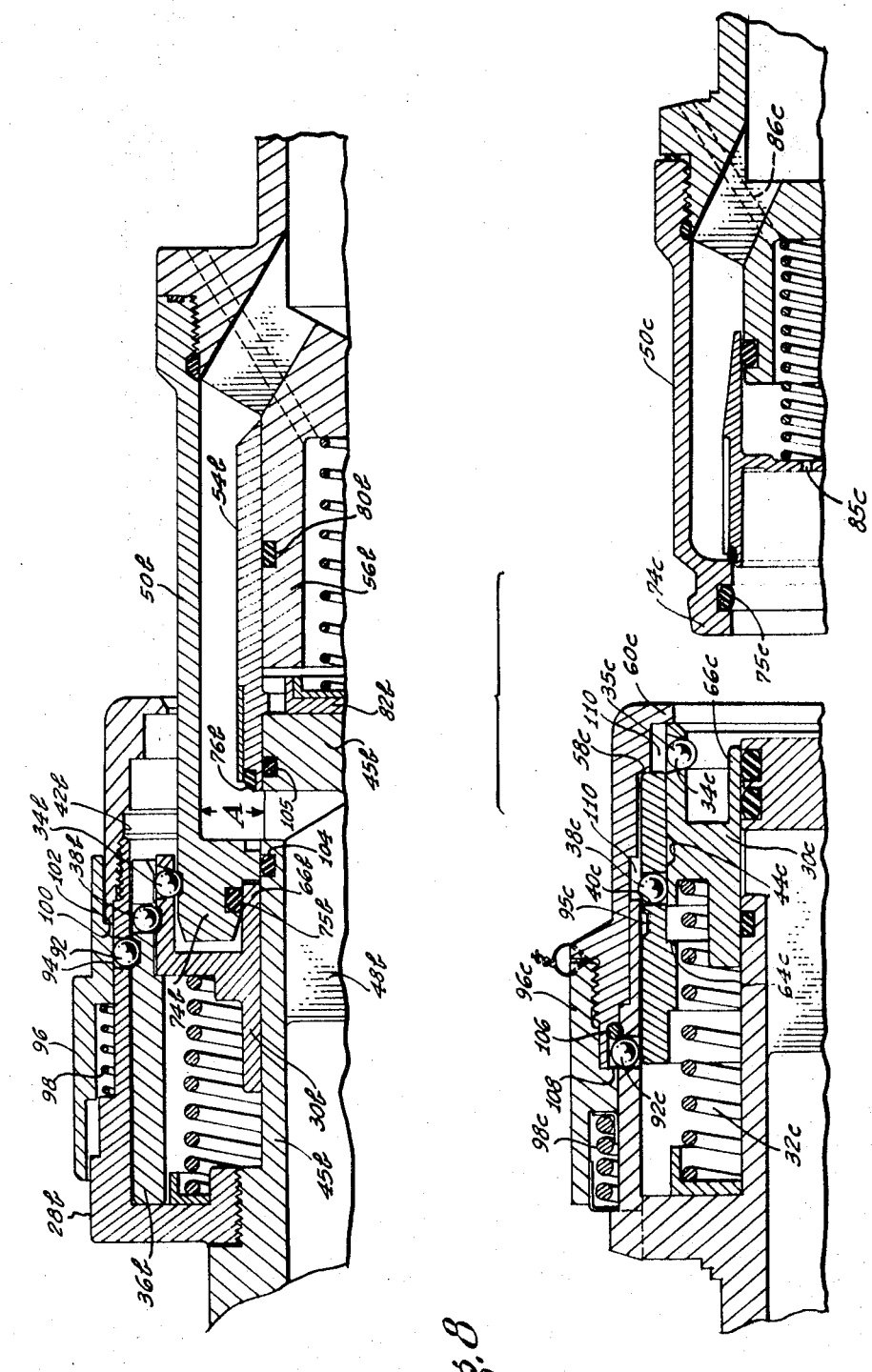

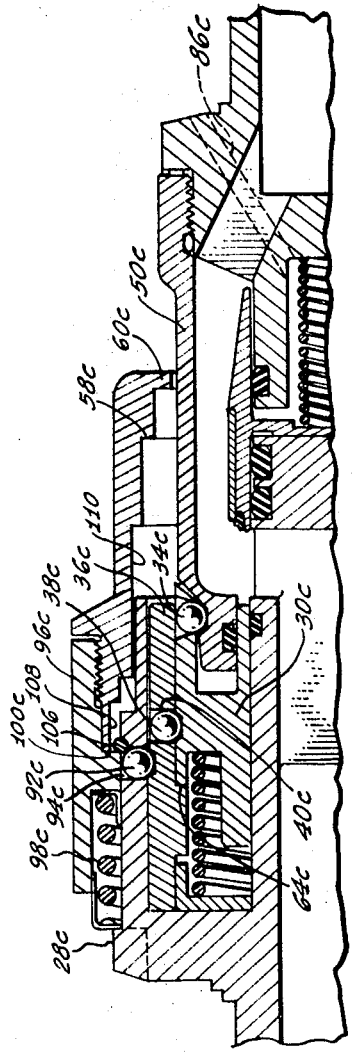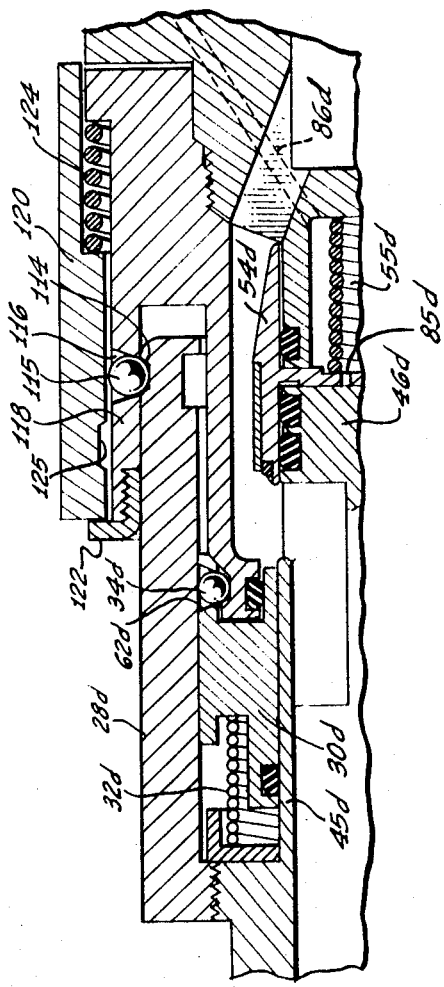

BALANCED PRESSURE COUPLING

This application is a continuation-in-part of my copending application Ser. No. 38,634 of the same title filed June 24, 1960 now abandoned.

This invention relates to couplings of the type in which two coupling bodies join in a quickly releasable manner for conveying a high-pressure fluid.

The invention is directed to problems that arise when pressure of the confined fluid exerts a separation force between the two coupling bodies. It has been found that under both static and dynamic conditions, a separation force is created if unequal areas of the two coupling bodies are subjected to the pressure of the confined fluid. Even with careful designing to minimize the differential between the areas of the opposed surfaces in the coupling that account for the separation force, the separation force may be of exceedingly high magnitude. This fact may be appreciated when it is considered that quick disconnect couplings are commonly used for fluids at 3,000 to 5,000 p.s.i. or higher. Such pressure exerted against an exceedingly small fraction of a square inch may create a separation force of several hundred pounds.

The most serious problem is encountered when several pressurized fluid lines are used to interconnect two quickly separable structures. For example, the two structures may be two successive stages of an aerial vehicle, such as a rocket, wherein the two stages are temporarily held together by quickly releasable means and each stage carries one of the two cooperating coupling bodies for each of the several pressurized fluid lines.

It is possible, of course, to connect the two coupling bodies of each pair together by quickly releasable means capable of carrying the fluid pressure separation force that acts between the two coupling bodies. It is not desirable to do so, however, for a number of good reasons. It is simpler to have the interstage fastening means carry the total of all of the separation forces exerted at the several pairs of coupling bodies since such an arrangement eliminates several individual releasable latch mechanisms for increased reliability of performance. The elimination of the individual latching means for the several pairs of coupling bodies has the further advantages of reducing cost, reducing weight and, moreover, reducing space requirements at the juncture at the two stages of the rocket.

If, however, individual latches for the several pairs of coupling bodies are omitted for the sake of the above advantages, the total of all of the separation forces must be carried by the interstage fastening means and this total may be tremendous. The possibility of structural failure or functional failure of the interstage fastening means is, of course, greatly increased. There is the further possibility that even if the interstage fastening means does not fail, the associated portions of the structure of the two stages may be overstressed and distorted unless the associated portions are made undesirably heavy.

In the use of a single pressurized fluid line in other kinds of situations, for example in the employment of a pair of coupling bodies to connect a high pressure hose to some conduit, a high magnitude fluid pressure separation force between the two coupling bodies creates problems. One problem is that greatly increasing the load on the mechanical interconnection between two coupling bodies makes it difficult to design the mechanical interconnection for quick and easy release. Another problem is the hazard involved in the manual manipulation of such a coupling. The mechanical interconnection may fail while the two coupling bodies are under high pressure or the separation force may suddenly become effective while the two coupling bodies are positioned together but are not mechanically interlocked.

Usually a valve is incorporated in at least one of the two coupling bodies to close off the coupling body automatically whenever the two coupling bodies are separated. For the desired automatic action, the valve member in one coupling body is retracted by the other coupling body from a forward closed position to a rearward open position when the two coupling bodies are moved into telescoping relation with each other. In the transition stage of connecting or disconnecting the two coupling bodies fluid under pressure inevitably has access to the opposing surfaces of the valve member and the adjacent leading surface of the abutting coupling body. In a conventional coupling construction the result is creation of separation force between the two coupling bodies.

The present invention avoids all of these difficulties. Two solutions are presented relating to the oppositely facing surface areas that are necessarily involved in the creation of axial fluid pressure separation force between two cooperating coupling bodies. According to one solution, one of the two surface areas is wholly on one coupling body and at least a portion of the other equal surface area is on a member that is movably mounted in the other coupling body. The movably mounted member is made responsive to the pressure of the confined fluid by exposing a rear surface of the movable member to a pressure lower than the pressure of the confined fluid. For this purpose, the space adjacent the rear end of the movable member may be vented to the exterior of the coupling. To complete the solution, a suitable latch means releasably connects the one coupling body with the movable member in the other coupling body so that the opposing forces are balanced and, in effect, cancelled out in the one coupling body.

The fluid pressure force that is imposed on the releasable latch when the two coupling bodies are inter-connected may be minimized by minimizing the area of the movable member that is exposed to the axial pressure of the confined fluid. For this purpose, the fluid passage through the two coupling bodies may be angular in configuration, i.e., may be formed with a change in direction so that the passage provides two opposite equal surface areas subjected to fluid pressure. All of one of these two passage surface areas and the major portion of the other passage surface area are fixed surfaces of the one coupling body, only a minor portion of the other passage surface area being a surface of the movable member in the other coupling body.

In the embodiments of the invention selected for the present disclosure, this first solution accounts for only a portion of the cross-sectional area of the mated coupling bodies that must be considered in dealing with fluid pressure separation force. Over the remaining portion of the cross-sectional area, leading surfaces of the two respective coupling bodies necessarily confront each other. The second solution provided by the invention is to vent the space between these confronting surfaces and to seal off this space from the confined pressurized fluid. With this arrangement, no fluid pressure separation force can act between the confronting surfaces.

With reference again to the first solution, the releasably latched movable member may have the sole purpose of eliminating fluid pressure separation force between the two bodies. A feature of the invention, however, is that where a valve member is used in one of a pair of cooperating coupling bodies to control flow therethrough, the valve member may be given the additional function of serving as the movable member for eliminating fluid pressure separation force between the two coupling bodies.

As will be explained, a feature of one practice of the invention is that in addition to the latch that connects the one coupling body with the valve member in the other coupling body for eliminating separation force between the two coupling bodies, a second latch may be provided to connect the retracted valve member to the coupling body in which it is mounted. Thus with both coupling bodies latched to the valve member, the two latches cooperate to connect the two coupling bodies with each other. The first latch, of course, must carry the fluid pressure separation force in addition to the mechanical force for holding the two coupling bodies together. The second latch, however, carries only the minor mechanical force. Consequently, the second latch that in effect mechanically interconnects the two coupling bodies may be of light construction and being lightly loaded, will be easily operated.

It has been further found that a second cause for separation force between the two coupling bodies commonly exists under dynamic conditions as distinguished from static conditions. This second cause of separation force arises from reaction to change in direction of the fluid stream at the juncture zone between the two coupling bodies, i.e., the zone bounded by two spaced sealing means where the flow is from one of the two coupling bodies to the other when the two coupling bodies are mated. In this regard, the present invention is based in part on the discovery of the existence of this second source of separation force and the further discovery that the cause exists only when the direction of fluid flow at the juncture between the two coupling bodies is at an acute angle to the common axis of the two coupling bodies, the cause being completely avoided when the direction of flow at the juncture is radial. The existence of this second cause of separation force under dynamic conditions and its cure have been established by careful tests.

The features and advantages of the invention may be understood by reference to the following detailed description considered with the accompanying drawings.

In the drawings, which are to be regarded as merely illustrative:

FIG. 1 is a simplified side elevational view of a rocket with separable stages to illustrate the problem solved by the invention;

FIG. 2 is a fragmentary longitudinal section of a coupling assembly embodying the invention, the two coupling bodies of the assembly being shown separated from each other with the respective valves therein closed;

FIG. 3 is a view similar to FIG. 2 showing an intermediate stage in the operation of telescoping the two coupling bodies together;

FIG. 4 is a similar view showing the two coupling bodies telescoped to cooperate with both of their valves open;

FIG. 5 is a fragmentary sectional view showing a modification of the first embodiment of the invention which eliminates a locking sleeve;

FIG. 6 is a fragmentary longitudinal sectional view illustrating a second embodiment of the invention, the two coupling bodies of the coupling assembly being shown separated from each other with their respective valves closed;

FIG. 7 is a similar view showing the two coupling bodies cooperating with both of their valves open;

FIG. 8 is a fragmentary longitudinal sectional view of a third embodiment of the invention showing the two coupling bodies of the coupling assembly separated from each other;

FIG. 9 is a similar view with the two coupling bodies interlocked; and

FIG. 10 is a fragmentary longitudinal sectional view of another embodiment of the invention, the view showing the two coupling bodies interconnected with both of their respective valves open.

THE FIRST EMBODIMENT SHOWN IN FIGS. 2 TO 4

FIG. 1 shows a rocket having a first stage 20, a second stage 22 and a third stage 24. A number of passages for conducting pressurized fluid extend from the third stage 24 to the second stage 22 and extend from the second stage to the first stage 20. For each of these fluid passages from one stage to the next stage, there is a pair of cooperating coupling means mounted on the respective stages. In FIG. 1, the pairs of coupling means are indicated in dotted lines, each pair comprising a coupling means C-1 on one stage of the rocket and a cooperating coupling means C-2 on the adjacent stage.

The two cooperating coupling means C-1 and C-2 of each pair merely telescope together without latching with each other. Thus all of the pairs of cooperating coupling means C-1 and C-2 between two of the stages of the rocket are held together solely by the releasable means that mechanically connects the stages together. In accord with the teachings of the invention, each of the pairs of coupling means is so constructed as to avoid the creation of any fluid pressure separation force. Thus the releasable means employed for mechanically interconnecting the successive stages of the rocket are free from any loading arising from the pressure of the fluids that pass through the pairs of coupling means.

FIGS. 2 to 4 illustrate an embodiment of the invention that may be employed for the pair of coupling means C-1 and C-2 in the rocket shown in FIG. 1. These figures show a coupling means C-1 mounted in a wall 25 of one stage of the rocket and a cooperating coupling means C-2 mounted in an adjacent wall 26 of the adjacent stage in the rocket.

The principal parts of the first coupling means C-1 include: a coupling body 28 that is mounted on the wall 25; a sleeve valve 30 which is urged towards a forward closed position by a coil spring 32; a set of circumferentially spaced latching balls 34 in corresponding apertures 35 of the sleeve valve; an inner locking sleeve 36 to lock the latching balls 34 in their latching positions; latching means which may be in the form of a set of circumferentially spaced latching balls 38 in corresponding radial apertures 40 in the locking sleeve, the latching balls 38 being adapted to cooperate with an inner circumferential latching groove 42 of the coupling body 28 and alternately to cooperate with an outer circumferential latching groove 44 of the sleeve valve 30; and a fixed axial structure of the coupling body that cooperates with the sleeve valve and which comprises an inner cylinder 45 on which the sleeve valve is slidingly mounted and an axial nose member 46 which is integrally connected with the inner cylinder 45 by a plurality of circumferentially spaced longitudinal radial webs 48.

The principal parts of the second coupling means C-2 include: a coupling body 50 that is mounted on the wall 26 and is formed with a locking shoulder 52 for engagement by the above-mentioned latching balls 34; a sleeve valve 54 that is urged towards a forward closed position by a coil spring 55; and an inner cylinder 56 which is a fixed part of the coupling body and on which the sleeve valve 54 is slidingly mounted.

Referring again to the first coupling means C-1, the coupling body 28 is formed with an inner circumferential shoulder 58 to serve as a forward stop for the locking sleeve 36 and is further formed with a forward radially inward flange 60 to serve as a stop for the sleeve valve 30. As may be seen in FIG. 1, there is an annular clearance 62 between the stop shoulder 58 and the stop flange 60 into which the latching balls 34 may be moved to release positions. The inner locking sleeve 36 is formed with an inner circumferential shoulder 64 for abutment by the rear end of the sleeve valve 30.

The sleeve valve 30 has an annular recess 65 on its forward end to receive the forward end of the coupling body 50, the annular recess forming the sleeve valve with an inner cylindrical flange 66 on its leading end. The rear end of the sleeve valve 30 is formed with an annular recess 68 to seat the forward end of the coil spring 32, the rear end of the spring seating against a flanged ring 70. The sleeve valve 30 is further formed with an inner circumferential recess to seat an O-ring 72 for sliding sealing contact with the inner cylinder 45 of the coupling body. The nose member 46 is formed with a pair of circumferential grooves to seat a corresponding pair of O-rings 73 for sealing contact with the sleeve valve 30, as shown in FIGS. 2 and 3, and for alternate sliding contact with the second sleeve valve 54 as shown in FIG. 4.

The coupling body 50 of the second coupling means C-2 has a thickened rim portion 74 dimensioned to seat in the annular recess 65 of the first sleeve valve 30 and this rim portion is formed with an inner circumferential groove to seat an O-ring 75 for sealing contact with the inner cylindrical flange 66 of the first sleeve valve. The forward end of the sleeve portion of the second sleeve valve 54 carries a small O-ring 76 retained by a band 78 in position for sealing contact with the rim portion 74 of the coupling body 50. A second O-ring 80 in a circumferential groove of the inner cylinder 56 makes sealing contact with the inner circumferential surface of the sleeve valve 54.

The second sleeve valve 54 is formed with a transverse wall or web 82 to seat the forward end of the coil spring 55. The rear end of the coil spring 55 seats against a transverse wall 84 of the coupling body 50. The transverse web 82 of the sleeve valve 54 is formed with a vent aperture 85. The space between the web 82 of the sleeve valve and the transverse wall 84 of the coupling body is vented to the exterior of the coupling body by a vent passage 86.

OPERATION

When the two coupling bodies are separated as shown in FIG. 2, the sleeve valve 30 in the coupling body 28 is held at its closed position by the spring 32. If any fluid is confined under pressure by the sleeve valve 30, the pressure of the fluid is exerted radially outward against the sleeve valve and, therefore, does not tend to move the sleeve valve in either direction. On the other hand, the second sleeve valve 54 in the second coupling body 50 is urged towards its closed position not only by the force of the spring 55 but also by the pressure of the fluid that is confined by the sleeve valve. This valve-closing pressure acts on the sleeve portion of the sleeve valve, i.e., the area between the inner circumference of the sleeve valve 54 and the circumference at which its O-ring 76 makes contact with the inwardly extending rim portion 74 of the coupling body 50. It is apparent that if a high pressure fluid is confined by the sleeve valve 54, there is no possibility of the sleeve valve being inadvertently opened by manual force.

FIG. 3 shows an intermediate stage in the operation of moving the two coupling means C-1 and C-2 into cooperating relation, which movement, of course, is accomplished by moving the two stages of the rocket together. At the stage shown in FIG. 3, the leading rim portion 74 of the coupling body 50 has moved into the recess 65 of the sleeve valve 30 into abutment with the sleeve valve and has retracted the sleeve valve appreciably without, however, opening the sleeve valve. The second sleeve valve 54 in the second coupling body 50 remains closed.

This initial retraction of the sleeve valve 30 is not transmitted to the inner locking sleeve 36 because the inner locking sleeve is immobilized by the seating of the latching balls 38 in the latching groove 42 of the coupling body 28. With the inner locking sleeve 36 immobilized, the retraction of the sleeve valve 30 carries the latching balls 34 under the rim of the inner locking sleeve thereby making the latching balls 34 effective to latch the sleeve valve 30 to the coupling body 50.

The retraction of the sleeve valve 30 to the position shown in FIG. 3 places the latching groove 44 of the sleeve valve in register with the latching balls 38 and at the same time the sleeve valve abuts the inner circumferential shoulder 64 of the inner locking sleeve 36. It is apparent that any further retraction of the sleeve valve 30 by the coupling body 50 from the position shown in FIG. 3 will result in retraction of the inner locking sleeve 36 and when the latching balls 38 are carried beyond the latching groove 42 as shown in FIG. 4, the inner locking sleeve will be latched to the sleeve valve 30 for movement therewith.

With the seating of the rim portion 74 of the coupling body 50 in the sleeve valve 30, the O-ring 75 of the coupling body 50 makes sealing contact with the inner cylindrical flange 66 of the sleeve valve and from this point on the interior of the two coupling bodies is effectively sealed off from the exterior. With continued movement of the two coupling bodies into telescoping relation, the nose member 46 of the coupling body 28 telescopes into the second sleeve valve 54 into abutment with the transverse web 82 of the sleeve valve and the two O-rings 73 of the nose member make sealing contact with the inner circumferential surface of the sleeve valve. Air or any other fluid trapped between the nose member 46 and the valve web 82 is displaced through the vent aperture 85 of the valve web into the space between the valve web and the transverse wall 84 of the coupling body. It is to be noted that the space between the valve web 82 and the transverse coupling wall 84 is vented to the atmosphere by the passage 86.

Telescoping action beyond this point causes both of the sleeve valves 30 and 54 to open. FIG. 4 shows the two coupling bodies telescoped together with both of the sleeve valves fully open. It is important to note that the sleeve valve 30 is latched to the coupling body 50 before either of the two sleeve valves opens to release any fluid that might create separation force between the two coupling bodies.

The cross-sectional area of the fully telescoped coupling bodies in FIG. 4 where fluid under pressure can possibly create separation force between the two coupling bodies is the area defined by the inner circumferential surface of the coupling body 50 that is indicated by reference numeral 88 in FIG. 4. This area may be divided into two areas where the previously mentioned two different solutions are used to avoid separation force.

One of these two areas is the outer annular cross-sectional area between the inner coupling surface 88 and the inner circumference of the second sleeve valve 54. The radial dimension of this outer annular cross-sectional area is indicated at A in FIG. 4. The fluid pressure that is exerted axially to the right in this annular area is resisted solely by surfaces to the right-hand coupling body 50. The equal surfaces to the left in this annular space on which the fluid pressure acts is in part the surface of the sleeve valve 30, i.e., the end surface of the cylindrical flange 66 of the sleeve valve, and in part the inner surface of the rim portion 74 of the coupling body 50. In other words, a first surface area that is positioned to be subjected to the pressure of the fluid in one axial direction is the surface of the coupling body 50 and the equal surface area that is subjected to the pressure of the fluid in the opposite axial direction is at least in part a surface of the sleeve valve 30.

With the sleeve valve 30 latched to the coupling body 50, all of the two opposed axial fluid pressures are in effect absorbed by the coupling body 50, the opposing forces being balanced to cancel each other. The balancing of the opposite forces in the coupling body 50 requires that the sleeve valve 30 be responsive to the fluid pressure. Thus, the sleeve valve 30 must have freedom to shift leftward relative to the left-hand coupling body 28 in which it is mounted so that it may transmit any separation force entirely to the second coupling body 50. In addition, the rear surface of the sleeve valve 30 should be subjected to a relatively low pressure to make the sleeve valve responsive to the pressure of the confined fluid. In this instance, the rear surface of the sleeve valve 30 is in effect vented to the atmosphere since no sealing rings exist between the sleeve valve 30 and the locking sleeve 36 nor do any seals exist between the locking sleeve and the surrounding cylindrical wall of the coupling body 28.

The remainder of the total cross-sectional area that must be considered with respect to separation forces is the area defined by the inside diameter of the second sleeve valve 54. No separation force between the two coupling bodies 28 and 50 can be created over this inner area because the space between the nose member and the transverse web 82 of the second sleeve valve 54 is vented to the atmosphere.

It is to be noted that the sleeve valve 30 has a relatively extensive initial range of closed positions through which it may be retracted by the coupling body 50 before it reaches a final range of movement in which it progressively opens. During this initial range of retraction of the sleeve valve 30, the second sleeve valve 54 also remains closed because substantially the same extent of relative movement between the two coupling bodies is required for the nose member 46 to abut the transverse web 82 of the second sleeve valve 54 to initiate opening movement of the second sleeve valve.

When the two coupling bodies are pulled apart from their cooperating positions shown in FIG. 4, the reverse sequence of actions occurs. It is important to note that as the two coupling bodies are progressively separated, the sleeve valve 30 stays latched to the coupling body 50 until both of the two sleeve valves are closed. Thus the sleeve valve 30 is automatically latched to the coupling body 50 whenever there is any possibility of any fluid pressure separation force acting on the sleeve valve.

With reference to separation forces under dynamic conditions attributable to the direction of flow at the juncture of the two coupling bodies, it is to be noted in FIG. 4 that the change in direction in the region of the reference letter "A" is strictly radial, i.e., perpendicular to the common axis of the two coupling bodies. If the interconnecting passage at the juncture were formed in part by a conical surface to direct the flow at an acute angle relative to the common axis of the two coupling bodies a hazardous separation force would be created. Such a conical surface is present in the right coupling body C-2 but here the flow is entirely within the second coupling body, not at the juncture between the two coupling bodies.

THE MODIFICATION SHOWN IN FIG. 5

FIG. 5 shows how the described embodiment of the invention may be simplified by omitting the inner locking sleeve 36. The construction in FIG. 5 is largely identical with the previously described construction as indicated by the use of corresponding numerals to indicate corresponding parts. The coupling body 28a is of the configuration shown with an inner cylindrical surface 90 for sliding confinement of the sleeve valve 30a. Since the previously mentioned latching balls 38 are omitted, the sleeve valve 30a does not have the previously mentioned outer circumferential latching groove 44.

When the sleeve valve 30a is in the position shown in FIG. 5, the coupling body 28a provides the usual annular clearance space 62a around the latching balls 34a to permit radially outward retraction of the latching balls as required for seating of the rim portion of the cooperating coupling body 50 in the sleeve valve 30a. Initial retraction of the sleeve valve 30a from the position shown in FIG. 5 results in confinement of the latching balls 34a by the inner circumferential surface 90 for effective latching of the sleeve valve 30a to the coupling 50.

The construction shown in FIG. 5 is suitable for relatively small couplings and for couplings under relatively low fluid pressure. If the separation force that acts on the sleeve valve 30a is of high magnitude, the outward pressure of the latching balls 34a against the inner circumferential surface 90 is of correspondingly high magnitude to create corresponding high resistance to axial movement of the sleeve valve. In the first described embodiment of the invention shown in FIGS. 2 to 4, however, the radially outward pressure of the latching balls 34 is against the inner locking sleeve 36 and since the locking sleeve moves with the sleeve valve through the major portion of the range of movement of the sleeve valve, the radially outward pressure of the latching balls does not create resistance to axial movement of the sleeve valve.

THE EMBODIMENT OF THE INVENTION SHOWN IN FIGS. 6 AND 7

The coupling shown in FIGS. 6 and 7 differs from the first embodiment of the invention in two respects. In the first place, the latching balls 34b that releasably connect the sleeve valve 30b with the coupling body 50b have the additional function in cooperation with other latching balls of mechanically connecting the coupling body 28b with the coupling body 50b. In the second place, the opposite surfaces that are subject to axial fluid pressure over the annular cross-sectional area A (FIG. 7) are entirely fixed surfaces of the coupling body 50b. Thus when the two coupling bodies 28b and 50b are fully telescoped together, the fluid pressure communication between the two coupling bodies is entirely radial so that no axial components of fluid pressure force whatsoever act between the two coupling bodies.

It is important to note, however, that while fluid pressure separation force is not effective between the two coupling bodies 28b and 50b when they are completely telescoped together as shown in FIG. 7, nevertheless fluid pressure separation force acts between the sleeve valve 30b and the leading end of the coupling body 50b during the transition period when the sleeve valve 30b is partially open in the course of the opening or closing movement of the sleeve valve. When such fluid pressure separation force is effective, the sleeve valve 30b is latched to the coupling body 50b by the latching balls 34b to balance the opposed fluid pressure in the coupling body 50b.

The construction shown in FIGS. 6 and 7 is largely similar to the construction of the first embodiment of the invention as indicated by the use of corresponding numerals to indicate corresponding parts. The coupling body 28b has the usual inner cylinder 45b that is slidingly embraced by the sleeve valve 30b. The coupling body 28b further includes the usual nose member 46b that is integrally connected with the cylinder 45b by radial webs 48b.

The coupling body 28b has an inner circumferential latching groove 42b for cooperation with the latching balls 38b that are carried by the inner locking sleeve 36b and the sleeve valve 30b has the usual latching groove 44b (FIG. 6) for cooperation with the same latching balls. A third set of latching balls 92 is provided to releasably connect the retracted inner locking sleeve 36b to the coupling body 28b. For this purpose, the latching balls 92 are confined in corresponding radial apertures 94 in the cylindrical wall of the coupling body 28b and the inner locking sleeve 36b is formed with an outer circumferential latching groove 95 to releasably seat the latching balls. To releasably confine the latching balls 92 in the latching groove 95 of the sleeve valve 30b, an outer locking sleeve 96 is provided. The outer locking sleeve 96 is urged forward by a coil spring 98.

When the two coupling bodies 28b and 50b are separated with the sleeve valve 30b at its forward limit position, the latching balls 92 protrude radially outward from the coupling body 28b and an inner circumferential shoulder 100 of the outer locking sleeve 96 abuts the latching balls 92 as shown in FIG. 6. When the inner locking sleeve 36b is fully retracted, however, the latching balls 92 seat in the latching groove 95 of the inner locking sleeve to latch the inner locking sleeve to the coupling body 28b and the outer locking sleeve 96 moves to a forward limit position to confine the latching balls 92. At this forward limit position of the outer locking sleeve 96, the inner circumferential shoulder 100 of the outer locking sleeve abuts an outer circumferential stop shoulder 102 of the coupling body 28b, as may be seen in FIG. 7.

The coupling body 50b carries the usual O-ring 75b for sealing contact with the forwardly extending cylindrical flange 66b of the sleeve valve 30b. The sleeve valve 30b does not carry an O-ring but the inner cylinder 48 of the coupling body 28b carries an O-ring 104 for sealing contact with the sleeve valve 30b as shown in FIG. 6 and for alternate sealing contact with the rim portion 74b of the coupling body 50b as shown in FIG. 7. The nose member 46b carries an O-ring 105 for sealing contact with the sleeve valve 30b as shown in FIG. 6 and for alternate sealing contact with the second sleeve valve 54b as shown in FIG. 7.

The second sleeve valve 54b carries the usual forward O-ring 76b for sealing contact with the rim portion 74b when the valve is closed. The inner circumferential surface of the second sleeve valve 54b is sealed by the usual O-ring 80b that is carried by the inner cylinder 56b of the coupling body 50b. The transverse web 82b of the second sleeve valve 54b has a usual vent aperture 85b and the coupling body 50b has the usual vent passage 86b. The usual coil spring 55b acts in compression between the transverse web 82b of the second sleeve valve and the transverse wall 84b of the coupling body 50b.

OPERATION OF THE EMBODIMENT SHOWN IN FIGS. 6 AND 7

When the coupling bodies 28b and 50b are moved together from the separated positions shown in FIG. 6 to the completely coupled positions shown in FIG. 7, the following acts occur in sequence. The rim portion 74b of the coupling body 50b seats against the sleeve valve 30b to start the retraction of the sleeve valve. At this time, as may be seen in FIG. 6, the surrounding inner locking sleeve 36b is immobilized by the latching balls 38b.

Initial retraction of the sleeve valve 30b carries the latching balls 34b into the interior of the inner locking sleeve 36b to lock the latching balls in latching engagement with the coupling body 50b. Immediately thereafter, the latching groove 44b of the sleeve valve 30b registers with the latching balls 38b and simultaneously the sleeve valve 30b abuts the inner circumferential shoulder 64b of the inner locking sleeve. Further retraction of the sleeve valve 30b begins the retraction of the inner locking sleeve 36b with consequent camming of the latching balls 38b into the latching groove 44b to latch the inner locking sleeve to the sleeve valve.

As the sleeve valve 30b reaches its fully open position, the latching groove 95 of the inner locking sleeve 36b registers with the latching balls 92 and the outer locking sleeve 96 acting under the pressure of the spring 98 cams the latching balls 92 into the latching groove 95. The forward movement of the outer locking sleeve continues to the limit position shown in FIG. 7 at which it effectively confines the latching balls 92 in their effective positions. In the meantime, the second sleeve valve 54b is opened by impingement of the nose member 46b against the transverse web 82b.

It is apparent that in this embodiment of the invention, separation force between the two coupling bodies over a central portion of the cross-sectional area of the two coupling bodies is prevented in the previously described manner by the vent aperture 85b and the vent passage 86b. In the outer annular cross-sectional area represented by the radius A, separation pressure between the two coupling bodies can occur only temporarily in a transition period when the sleeve valve 30b is only partially open.

It is apparent that the latching balls 34b not only carry the transitional fluid pressure separation force that acts between the sleeve valve 30b and the coupling body 50b but also carries whatever forces may be involved in the mechanical interconnection of the two coupling bodies. The mechanical forces are, however, relatively small. Only the mechanical forces are imposed on the latching balls 38b and the latching balls 92. Since these mechanical forces are relatively slight, the outward reaction of the latching balls 38b against the inner circumferential surface of the coupling body 28b is relatively slight and the outward reaction of the latching balls 92 against the inner circumferential surface of the outer locking sleeve 96 is also slight. Thus the fluid pressure separation force that occurs during the transition period does not create resistance to movement of the inner locking sleeve 38b relative to the coupling body 28b and does not create resistance to the releasing retraction of the outer locking sleeve 96.

A further advantage of the embodiment of the invention shown in FIGS. 6 and 7 over the first embodiment of the invention is that there are fewer leakage paths when the two coupling bodies are fully telescoped together. In FIG. 4, the four possible leakage paths are blocked by the O-rings 72, 73, 75 and 80, respectively. In FIG. 7, there are only three leakage paths, the three leakage paths being blocked by the O-rings 104, 105 and 80b, respectively.

THE EMBODIMENT OF THE INVENTION SHOWN IN FIGS. 8 AND 9

This form of the invention combines the latching ball arrangement of FIGS. 6 and 7 with the valve arrangement of FIGS. 2 to 4. In other words, the construction is the same as in FIGS. 6 and 7 except for the fact that when the two valves are open, separation force is exerted on the first sleeve valve as in FIGS. 2 to 4.

The coupling body 28c is relatively short and the outer locking sleeve 96c extends beyond the coupling body. The outer locking sleeve 96c which is made in two screw-threaded parts is urged forward by the usual spring 98c and has a forward limit position shown in FIG. 9 at which its inner circumferential shoulder 100c abuts a stop in the form of a thin snapring 106. The inner circumference of the outer locking ring 96c provides a recess or circumferential groove 108 for release movement of the latching balls 92c, a circumferential clearance space 110 for release movement of the latching balls 38c, a circumferential stop shoulder 58c for the inner locking sleeve 36c, a circumferential clearance space 62c for the latching balls 34c and a radially inward flange 60c to serve as a forward stop for the first sleeve valve 30c.

The coupling body 28c has radial apertures 94c for the latching balls 92c and the inner locking sleeve 36c has a latching groove 95c to seat the latching balls 92c. The inner locking sleeve 36c has an inner circumferential shoulder 64c for abutment by the sleeve valve 30c and has radial apertures 40c to retain the latching balls 38c.

The sleeve valve 30c which is under pressure from a spring 32c has a latching groove 44c to releasably seat the latching balls 38c and has the usual tapered radial apertures 35c for the latching balls 34c. The sleeve valve 30c is further formed with the leading inner cylindrical flange 66c for sealing contact with the O-ring 75c in the rim portion 74c of the second coupling body 50c.

The manner in which this construction functions for interlocking of the two coupling bodies may be readily understood from the previous description of the embodiment shown in FIGS. 6 and 7. The fluid pressure separation force that is exerted against the sleeve valve 30c when it is in open position is transmitted to the coupling body 50c by the latching balls 34c, but here again the fluid pressure does not load the latching balls 38c nor does it load the latching balls 92c.

THE EMBODIMENT SHOWN IN FIG. 10

The coupling assembly shown in FIG. 10 is largely similar to previously described embodiments of the invention as indicated by the use of corresponding numerals to indicate corresponding parts. The basic distinction is that two separate and independent latches are employed for mechanically interconnecting the two coupling bodies and for releasably connecting a member in one coupling body to the other coupling body to eliminate fluid pressure separation force between the two coupling bodies.

The construction of the coupling body 28d and its associated parts is identical to the construction of the coupling body 28a and the associated parts shown in FIG. 5 except that the coupling body is formed with an outer circumferential groove that forms a locking shoulder 114. When the coupling bodies 28d and 50d are telescoped together to open both of the sleeve valves 30d and 54d, the latching shoulder 114 is engaged by a series of circumferentially spaced latching balls 115 in the coupling body 50d.

The latching balls 115 are confined in radial apertures 116 in a cylindrical portion 118 of the coupling body 50d that is shaped and dimensioned to telescope over the leading end of the coupling body 28d. A locking sleeve 120 slidingly embraces the cylindrical portion 118 and is urged towards a stop flange 122 by a coil spring 124. When the locking sleeve 120 is manually retracted against the opposition of the spring 124, an inner circumferential groove 125 of the locking sleeve registers with the apertures 116 to provide clearance for retraction of the latching balls 115 radially outward out of engagement with the coupling body 28d.

It is readily apparent that the latching balls 34d carry all of the fluid pressure separation force that is created between the sleeve valve 30d and the coupling body 50d. Since this separation force is not carried to the latching balls 115, it does not create any resistance whatsoever to manual operation of the locking sleeve 120.

My description in specific detail of the selected embodiments of the invention will suggest various changes, substitutions and other departures from my disclosure within the spirit and scope of the appended claims.

I claim:

1. A coupling assembly for releasably interconnecting a first passage means and a second passage means for flow of pressurized fluid between the two passage means, comprising:

a first coupling means and a second coupling means for mounting on the ends of said first and second passage means respectively, said two coupling means being adapted to mate to place the two passage means in fluid communication with each other, said two coupling means when mated having opposed surfaces of equal area exposed to the pressure of the confined fluid with equal central portions of said opposed surfaces on the two coupling means respectively with said central portions vented to the atmosphere to keep the pressurized fluid from creating separation pressure between said equal central portions of the opposed surfaces, the remaining portions of said opposed surfaces being of equal area and being connected to only one of said coupling means when the two coupling means are mated to transmit the opposite fluid pressures to the same coupling means to keep the opposite fluid pressures from exerting separation pressure between the two coupling means over the area of said remaining portions of the opposed surfaces, said two coupling means when mated forming a continuous fluid passage in which the direction of flow at the juncture of the two coupling means is perpendicular to the common axis of the two coupling means.

2. A combination as set forth in claim 1 which includes:

a first sleeve valve in said first body with the rearward area of the sleeve valve in communication with the atmosphere;

spring means normally holding said sleeve valve at an advanced closed position;

a second coupling body adapted to mate with the first coupling body and dimensioned to abut and retract said sleeve valve in response to relative movement of the two bodies axially towards each other;

means responsive to retraction of said sleeve valve by said second body to releasably interlock the sleeve valve with the second body;

a second sleeve valve in said second body; and spring means normally holding said second sleeve valve at an advanced closed position, said first sleeve valve being free from connection with said first coupling body when the two coupling bodies are mated whereby the two coupling bodies may be freely separated from each other in response to mechanical axial force without mechanical interference.

3. A coupling assembly for interconnecting two fluid passage means, comprising:

a first coupling body;

a first sleeve valve in said first body;

spring means normally holding said sleeve valve at an advanced closed position;

a second coupling body adapted to mate with the first coupling body and dimensioned to abut and retract said first sleeve valve in response to relative movement of the two bodies axially towards each other;

a second sleeve valve in said second body;

spring means normally holding said second sleeve valve at an advanced closed position;

means inside the first body to abut and retract the second sleeve valve in response to said relative movement between the two bodies;

passage means in one of said bodies to place the region in front of said inside means in communication with the atmosphere to avoid separation pressure in the central region when the two coupling bodies are mated;

means responsive to retraction of said first sleeve valve by said second body to releasably interlock the first sleeve valve with the second body.

4. A combination as set forth in claim 2 in which said two coupling bodies, when mated, form a continuous fluid passage in which the direction of flow at the juncture of the two coupling bodies is perpendicular to the common axis of the two coupling bodies.

5. A combination as set forth in claim 3 in which said means to releasably interlock the first sleeve valve with the second body comprises latch means carried by the first sleeve valve and a cooperating surface of the first body to cam the latch means into engagement with the second body in response to relative movement between the first sleeve valve and the first body.

6. A combination as set forth in claim 3 in which said means to releasably interlock the first sleeve valve with the second body comprises:

latch means carried by the first sleeve valve; and a locking sleeve embracing the first sleeve valve inside the first body, said locking sleeve having a cam surface to move said latch means into engagement with the second body in response to relative movement between the first sleeve valve and the locking sleeve.

7. A combination as set forth in claim 6 which includes a second outer locking sleeve and latch means cooperative therewith to interlock the two bodies.

8. A combination as set forth in claim 3 which includes manually releasable means to directly interconnect the first and second coupling bodies in response to mating of the two bodies.

9. A coupling assembly for interconnecting two fluid passage means, comprising:

a first coupling body;

a first sleeve valve in said first body with the rearward region of the sleeve valve in communication with the atmosphere;

spring means normally holding said sleeve valve at an advanced closed position;

a second coupling body adapted to mate with the first coupling body and dimensioned to abut and retract said first sleeve valve in response to relative movement of the two bodies axially towards each other;

means responsive to retraction of said first sleeve valve by said second body to releasably interlock the sleeve valve with the second body;

a second sleeve valve in said second body;

means inside the first body to abut and retract the second sleeve valve in response to said relative movement between the two bodies;

passage means in one of said bodies to place the region in front of said inside means in communication with the atmosphere to avoid separation pressure in the central region when the two coupling bodies are mated, said second sleeve valve having a radially inwardly extending transverse wall;

cylindrical guide means for said second sleeve valve inside the second sleeve valve and forming therewith a spring chamber; and spring means in said chamber to urge said second sleeve valve towards its advanced closed position, the region in front of said transverse wall being vented to said chamber and said chamber being vented to the atmosphere to avoid separation pressure in said region when the two bodies are interlocked.

10. A combination as set forth in claim 9 in which said two coupling bodies when mated form a continuous fluid passage in which the direction of flow at the juncture of the two coupling bodies is perpendicular to the common axis of the two coupling bodies.

11. A coupling assembly for interconnecting two fluid passage means, comprising:

a first coupling body;

a first sleeve valve in said first body with the rearward region of the sleeve valve in communication with the atmosphere;

spring means normally holding said sleeve valve at an advanced closed position;

a second coupling body adapted to mate with the first coupling body and dimensioned to abut and retract said first sleeve valve in response to relative movement of the two bodies axially towards each other;

a second sleeve valve in said second body;

spring means normally holding said second sleeve valve at an advanced closed position;

means inside the first body to abut and retract the second sleeve valve in response to said relative movement between the two bodies;

passage means in one of said bodies to place the region in front of said inside means in communication with the atmosphere to avoid separation pressure in the central region when the two coupling bodies are mated; and means responsive to retraction of said first sleeve valve by said second body to releasably interlock the sleeve valve with the first body thereby to interlock the two bodies.

12. A coupling assembly for interconnecting two fluid passage means, comprising:

a first coupling body;

a first sleeve valve in said first body with the rearward surface of the sleeve valve in communication with the atmosphere;

a cylindrical guide in said first body for said first sleeve valve, said sleeve valve slidingly embracing the guide and the guide having a radial port controlled by the first sleeve valve;

spring means normally holding said sleeve valve at an advanced closed position;

a second coupling body adapted to mate with the first coupling body and dimensioned to abut and retract said sleeve valve in response to relative movement of the two bodies axially towards each other, said second coupling body being adapted to slidingly and sealingly engage said cylindrical guide of the first body to seal off the first sleeve valve from the confined fluid when the two coupling bodies are mated with the first sleeve valve open;

a second sleeve valve in said second body;

spring means normally holding said second sleeve valve at an advanced closed position;

means inside the first body to abut and retract the second sleeve valve in response to said relative movement between the two bodies; and passage means in one of said bodies to place the region in front of said inside means in communication with the atmosphere to avoid separation pressure in the central region when the two coupling bodies are mated.

13. A combination as set forth in claim 12 which includes means responsive to retraction of said first sleeve valve by said second body to releasably interlock the first sleeve valve with the second body.

14. A coupling assembly for releasably interconnecting a first passage means and a second passage means for flow of pressurized fluid between the two passage means, comprising:

a first coupling means and a second coupling means for mounting on the ends of said first and second passage means respectively, said two coupling means being adapted to mate to place the two passage means in fluid communication with each other, said two coupling means when mated having opposed surfaces extending over a central part of their cross-sectional area with said opposed surfaces vented to the atmosphere and sealed off from the pressurized fluid, said two coupling means when mated having a first surface area located to be subjected to the pressure of the fluid in one axial direction and a second surface area coextensive with said first surface area located to be subjected to the pressure of the fluid in the opposite axial direction, said first and second surface areas extending over the remaining portion of the cross-sectional area of the mated couplings, said first surface area being on said second coupling means and at least a portion of said second surface area being a forwardly facing surface of a member of said first coupling means whereby fluid pressure separation force is exerted between said member and the second coupling means, said member being mounted in said first coupling means for relative movement in said opposite axial direction and having its rear surface vented to make the member responsive to the fluid pressure on its forwardly facing surface; and means to releasably connect said member of the first coupling means with said second coupling means to transmit said separation force from said member to the second coupling means thereby to keep the opposite axial fluid pressures on said first and second surface areas from tending to separate said first and second coupling means.

15. A combination as set forth in claim 14 in which said releasably connecting means is responsive to relative movement between the two coupling means.

16. A coupling assembly for releasably interconnecting a first passage means and a second passage means for flow of pressurized fluid between the two passage means, comprising:

a first coupling body and a second coupling body for mounting on the ends of said first and second passage means respectively, said two coupling bodies being adapted to telescope together to place the two passage means in fluid communication with each other;

a first valve member positioned in said first coupling body for retraction by the second coupling body from a normal forward closed position through an initial range of closed positions to an open position, the rearward area of said valve member being in communication with the atmosphere;

a second valve member positioned in said second coupling body for retraction by the first coupling body from a normal forward closed position to a rearward open position, said two coupling bodies when telescoped together having a first surface area positioned to be subjected to the fluid pressure in one axial direction and a second equal surface area positioned to be subjected to the fluid pressure in the opposite axial direction, all of said first surface area and a portion of said second surface area being on said second coupling body, the remaining portion of said second surface area being a forwardly facing surface of said first valve member; and means to latch said first valve member to said second coupling body while said second valve is closed in response to retraction of said first valve member within said initial range and vice versa whereby said first valve member is always latched to the second coupling body whenever the first and second valve members are in open positions.

17. A coupling assembly for interconnecting two fluid passage means, comprising:

a first coupling body;

a first sleeve valve in said first body with the rearward surface of the sleeve valve in communication with the atmosphere;

spring means normally holding said sleeve valve at an advanced closed position;

a second coupling body adapted to mate with the first coupling body and dimensioned to abut and retract said sleeve valve in response to relative movement of the two bodies axially towards each other;

means responsive to retraction of said sleeve valve by said second body to releasably interlock the sleeve valve with the second body;

a second sleeve valve in said second body;

spring means normally holding said second sleeve valve at an advanced closed position;

means inside the first body to abut and retract the second sleeve valve in response to said relative movement between the two bodies; and passage means in one of said bodies to place the region in front of said inside means in communication with the atmosphere to avoid separation pressure in the region when the two coupling bodies are mated, said first sleeve valve being free from connection with said first coupling body when the two coupling bodies are mated whereby the two coupling bodies may be freely separated from each other in response to axial force without mechanical interference.

18. A coupling assembly for interconnecting two fluid passage means, comprising:
a first coupling body;
a first sleeve valve in said first body with the rearward surface of the sleeve valve in communication with the atmosphere;
a cylindrical guide in said first body for said first sleeve valve, said sleeve valve slidingly embracing the guide and the guide having a radial port controlled by the first sleeve valve;
annular sealing means embracing said cylindrical guide;
spring means normally holding said sleeve valve at an advanced closed position;
a second coupling body adapted to mate with the first coupling body,
said second coupling body having a forward circumferential flange extending radially inwardly and dimensioned to abut and retract said first sleeve valve to move the first sleeve valve to open position and to telescope over said cylindrical guide in sealing contact with said sealing means to seal off the first sleeve valve at its open position from the fluid confined by the two coupling bodies;
a second sleeve valve in said second body;
spring means normally holding said second sleeve valve at an advanced closed position;
means inside the first body to abut and retract the second sleeve valve in response to relative movement of the two bodies axially towards each other; and
passage means in one of said bodies to place the region in front of said inside means in communication with the atmosphere to avoid separation pressure in the central region when the two coupling bodies are mated.

19. In a coupling assembly wherein two coupling bodies, with a sleeve valve in at least one of the two bodies mate for fluid flow therethrough with fluid flowing from one body to the other body through a juncture zone bounded by two spaced annular sealing means and wherein the two coupling bodies are balanced with respect to opposite surfaces under static pressure to prevent the creation of a separation force between the two bodies by static pressure, the improvement to prevent the creation of a separation force between the two bodies in reaction to change in direction of the flow of the fluid at the juncture zone, comprising:
the fluid passage formed by the two interlocked coupling bodies being characterized by radial flow from one coupling body to the other at said juncture zone perpendicular to the common axis of the two coupling bodies as distinguished from flow at an angle of less than 90° relative to the common axis.